May 26, 1953  L. E. PUCHER ET AL  2,640,090
BATTERY
Filed June 3, 1949

INVENTORS
LEO E. PUCHER
BY WILLIAM A. CUNNINGHAM
Hudson, Boughton,
Williams, David & Hoffmann.
ATTORNEYS Patented May 26, 1953

2,640,090

UNITED STATES PATENT OFFICE 2,640,090

BATTERY

Leo E. Pucher, South Euclid, and William A. Cunningham, Cleveland, Ohio, assignors to Willard Storage Battery Company, Cleveland, Ohio, a corporation of West Virginia Application June 3, 1949, Serial No. 96,908

8 Claims. (Cl. 136—100)

The present invention relates to batteries and, more particularly, to primary batteries capable of activation by the mere addition of water thereto and to a method of making the same.

Because batteries have a limited shelf life, there is considerable demand for a battery that can be stored dry for any period of time and quickly and conveniently activated merely by the addition of water thereto.

The principal object of the present invention is the provision of a novel and improved battery of the character mentioned which is relatively rugged in construction, inexpensive to manufacture, and has good operating characteristics over a wide temperature range.

Another object of the invention is the provision of a novel and improved method of making a battery of the character referred to in the preceding object.

Figure 1:
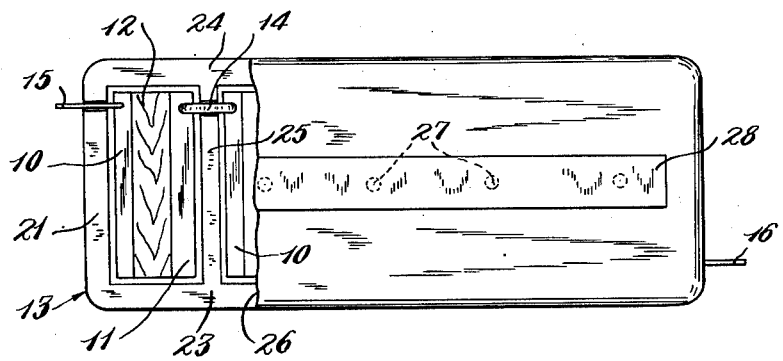
Figure 2:
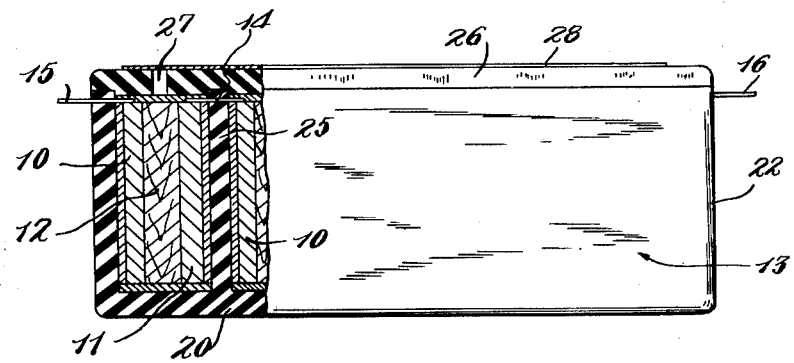

The invention resides in certain constructions and combinations and arrangements of parts and further objects and advantages thereof will be apparent to those skilled in the art to which the invention relates from the following description of the preferred embodiment described with reference to the accompanying drawings forming a part of this specification, and in which:

Fig. 1 is a plan view, with portions broken away to show the interior construction, of a battery embodying the present invention; and Fig. 2 is a side elevational view, with portions broken away, of the battery shown in Fig. 1.

Referring to the drawings, the battery shown therein is of the multi-cell type and comprises a plurality of battery elements each including a negative plate 10 and a positive plate 11 separated from each other by an insulator 12 made of wood or other suitable material, preferably an absorbent material, such as, bark fiber. The battery elements are housed within a suitable multi-compartment or cell container 13 and the respective plates of each cell are connected to the plates of opposite polarity of the adjacent cell by inter-cell connectors 14, with the exception of the two end cells, the non-connected plates of which are connected to terminal wires 15, 16 projecting through the container 13.

The container 13 is made of any suitable material, such as, polystyrene and, as shown, comprises a bottom 20, end walls 21, 22, side walls 23, 24, partitions 25, and a removable cover 26. The cover 26 is preferably cemented to the container proper after the battery elements are assembled therein and the necessary internal connections made. The cover 26 is provided with filler openings 27, one communicating with each of the cell compartments through which water may be admitted when it is desired to activate the battery. As previously stated, the insulators which separate the respective plates of each battery element are preferably made of absorbent material and each battery element is preferably completely enclosed in similar material before it is assembled in the container. When so constructed and the battery is activated by the addition of water there is little, if any, free liquid in the container and it is not necessary to seal the filler openings during use in order to avoid spilling the liquid or electrolyte.

The negative plates 10 are preferably formed of sheet magnesium; however, other forms of magnesium may be used, such as, magnesium screen or powdered magnesium suitably secured to or retained in a suitable grid. In the battery shown, the negative plates are about .016" thick and are formed of sheet magnesium.

The positive plates 11 are of the pasted grid type and comprise cuprous chloride pasted upon a grid preferably one formed of copper screen wire. The prepartion of the positive plates presents a major problem as a cuprous chloride and water mixture or paste when dried has very little mechanical strength and plates made therefrom are easily disintegrated. The addition of inert binder material to strengthen the dry active cuprous chloride has been proposed but the materials used reduces both the voltage and capacity of the cells.

It has been discovered that the addition of a small quantity of silver chloride to a cuprous chloride and water mixture or paste produces a paste that is easy to handle and apply or paste, has a short setting time, produces a pasted grid having good mechanical strength, and increases the voltage and capacity of the cell in which it is employed.

It has also been found that the addition of a small quantity of either or both ammonium chloride and potassium chloride to the positive plate paste improves the battery. The addition of ammonium chloride particularly reduces the time required for activation of the positive plate when it is desired to place the cell or battery in service. The addition of ammonium chloride and potassium chloride also increases the operating temperature range of the battery. The ammonium adds heat to the electrochemical action and thus aids low temperature operation and the potassium chloride tends to restrict the effect of the heat which might otherwise burn up or destroy the cell when subjected to high temperatures. Both the potassium chloride and the ammonium chloride but, more particularly, the potassium chloride, also improves the conductivity of the cell and in this way increases or improves the operation of the battery at low temperatures.

The specific amounts of silver chloride, ammonium chloride and/or potassium chloride used may vary according to the particular use for which the battery is designed and the hardness of the plates desired. If hard plates are not required, the silver chloride may be omitted entirely.

In making the paste, the cuprous chloride and silver chloride are mixed together in dry powdered form. To this is added an ammonium chloride and/or potassium chloride solution to produce a mix having a consistency that can be conveniently pasted on a grid. The grid is preferably a copper screen of any appropriate size which will support the paste.

By way of example, a very satisfactory paste has been produced by grinding together ninety-six grams of dry cuprous chloride and four grams of dry silver chloride until they were thoroughly mixed and then adding 12.75 cc. of water solution containing .1% by weight ammonium chloride and a .4% by weight potassium chloride. This mix was then applied to a copper screen 40 x 40 mesh and air-dried over night. The resulting plates were approximately .025" to .035" thick and when assembled with negative magnesium plates of the character mentioned in a suitable container and water added thereto produced a cell having a voltage of about 1.5 volts and a satisfactory temperature operating range from 140° F. to minus 58° F.

Referring again to the drawing, the terminal wires 15, 16 are sealed where they project through the battery container 13 and the filler openings 27 are, because of the hygroscopic nature of the cuprous chloride, also sealed as by a strip of moisture-proof tape 28 until the battery is ready to be placed into service. When it is desired to place the battery in service, it is merely necessary to remove the tape 28 and dump the battery in water for a short period or add water to the cells in some other way through the filler openings 27.

From the foregoing description of the preferred embodiment of the invention, it will be apparent that the objects heretofore enumerated and others have been accomplished and that there has been provided a novel and improved battery that can be stored dry and quickly activated when it is desired to use the same by the mere addition of water. While the preferred embodiment of the invention has been described in considerable detail, the invention is not limited to the particular construction shown and it is our intention to cover hereby all adaptations, modifications and uses thereof which come within the practice of those skilled in the art to which the invention relates.

Having thus described our invention, we claim:

1. A battery comprising a negative plate having magnesium as the active agent and a positive plate composed essentially of cuprous chloride and silver chloride.

2. A battery comprising a negative plate having magnesium as the active agent and a positive plate composed essentially of cuprous chloride, silver chloride and ammonium chloride.

3. A battery comprising a negative plate having magnesium as the active agent and a positive plate composed essentially of cuprous chloride, silver chloride and potassium chloride.

4. A battery comprising a negative plate having magnesium as the active agent and a positive plate composed essentially of cuprous chloride, silver chloride, ammonium chloride and potassium chloride.

5. A battery comprising a negative plate having magnesium as the active agent and a positive plate composed essentially of cuprous chloride and ammonium chloride.

6. A battery comprising a negative plate having magnesium as the active agent and a positive plate composed essentially of cuprous chloride and potassium chloride.

7. A battery comprising a negative plate having magnesium as the active agent and a positive plate composed essentially of cuprous chloride, ammonium chloride and potassium chloride.

8. A battery comprising a negative plate having magnesium as the active agent, and a positive plate composed essentially of cuprous chloride and a chloride of the group consisting of silver chloride, ammonium chloride and potassium chloride.

LEO E. PUCHER.
WILLIAM A. CUNNINGHAM.

References Cited in the file of this patent

UNITED STATES PATENTS

| Number | Name | Date |
| --- | --- | --- |
| 270,702 | Scrivanow | Jan. 16, 1883 |
| 2,322,210 | Adams | June 22, 1943 |